Feb. 24, 1953 — L. GOSNELL — 2,629,511
LID FOR COOKING UTENSILS
Filed March 3, 1949
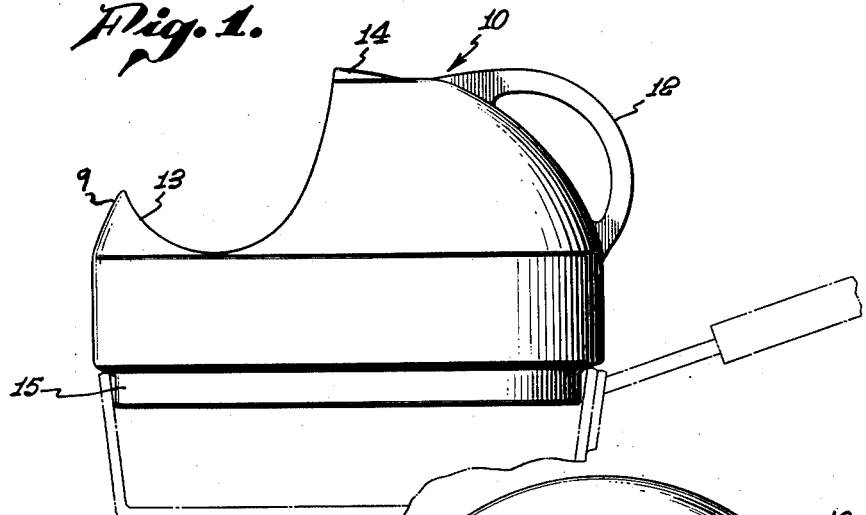
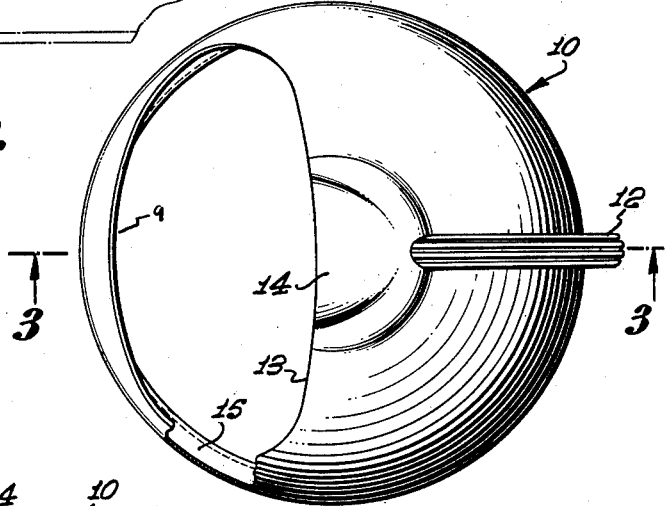
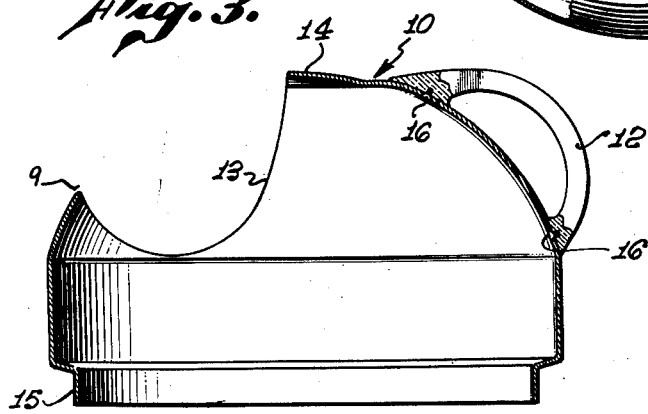
INVENTOR.
Mrs Lavern Gosnell Patented Feb. 24, 1953

2,629,511

UNITED STATES PATENT OFFICE 2,629,511

LID FOR COOKING UTENSILS

Lavern Gosnell, Los Angeles, Calif.

Application March 3, 1949, Serial No. 79,351

1 Claim. (Cl. 220—24)

*Object and nature of invention*

The object of the invention is to produce a lid which will prevent grease from spattering the cook, limit the spattering on the stove, and at the same time have same lid not interfere with the cooking of the food or the turning of the food.

*General description*

Fig. 1 is a side elevation of the improvement mounted on a skillet fragmentarily shown in phantom lines.

Fig. 2 is a top plan view having a portion broken away to show underlying structure.

Fig. 3 is a section, partly in elevation, on line 3—3 of Fig. 2.

Referring in detail to the drawing, therein is illustrated a dome shaped lid or cover 10 which has in the upper part of one side portion a spacious opening 13, said opening being confined to a space located between the top central part 14 of the cover and that side portion of the cover which is diametrically opposite to its handle 12. Along that edge portion of said opening 13 which is farthest from said handle, that is to say, in the outer part of said opening, the sheet metal is deflected toward the center of the cover thus providing a guard lip 9 that lessens the danger of spattering out of the material being cooked under said cover.

A right angularly shaped (when viewed in cross section) basal flange 15 is provided along the bottom edge of said cover 10, thus providing in the cover a diametrically contracted zone and along the upper edge of said zone a downwardly facing annular shoulder together with a circular centering flange which extends downwardly from the inner side of said zone, this flange being fittable within the upper part of a circular cooking utensil to keep the cover in place thereon.

It will be noticed that the general body 10 of the lid is so constructed in height as to allow steam to readily escape, thus not interfering with the process of frying. The height of the general body 10 also allows for turning of food. The shape of the general body 10 is so constructed as to eliminate crevices in which grease could collect, thus making it easy to clean.

As shown in Figure 2 the upper dome shaped portion of the lid is provided with an ellipitical opening 13 having its minor axis substantially corresponding to one-half the diameter of the lower waist portion of the lid and its major axis substantially corresponding to the diameter of the waist portion so that food can be turned without removing the cover 10, thus eliminating spattering. This opening 13 is large enough to allow steam to escape, but so located as to prevent grease from spattering back at the cook. The lip 9 on the outer side of the opening 13 is so located as to catch grease which would otherwise fall on the stove.

The convex portion 14 located at the top of the general body 10 of the cover allows the steam to flow up and allows more turning space when turning food.

The handle 12 is to be made of a non-conducting metal or heat resisting composition and is so located on the lid to make grasping easy. The size and shape of the handle 12 is such as to allow the lid to be picked up or placed on the skillet without burning the fingers. The handle 12 is to be spot riveted as indicated at 16 to the lid.

It is to be noted that the front edge portion of the spacious opening 13, as viewed in side elevation (see Fig. 1), is downwardly inclined in an arcuate manner at each side of the upwardly directed guard lip 9, to the upper edge of the subjacent cylindrical portion of the cover, and is thence arcuately continued to the top of the lid. Thus contouring said opening affords a spacious clearance at each side of said lip, these clearances enabling the operator to direct a fork into either the right or left side edge portions of a chop being cooked under the cover, thus making it easier to turn said chop. The dome shape of the cover and down-dip of said opening at each side of said lip 9, are features which co-operate to produce this easier handling of the chop being cooked by a fork or the like inserted through said opening at either side of said lip.

It is to be understood that, without departing from the spirit and scope of the invention, changes may be made in the construction and in the combination and arrangement of the several parts, provided that such changes fall within the scope of the appended claim.

I claim:

In a spatter lid adapted for fitting on the circumferential wall of a frying pan, a hollow body having a cylindrical waist portion, a diametrically contracted skirt depending and offset from said waist portion, said skirt fitting concentrically within the circumferential wall of the pan and said offset forming a horizontal shoulder seating on the top edge of the wall, a domical head rising from the waist portion and provided with a substantially elliptical opening in one side thereof, said opening having its minor axis substantially corresponding to one-half the diameter of the waist and its major axis substantially corresponding to the diameter of the waist, a handle fixed on the covered domical upper part of the body, and a vertically tapered lip rising from an arcuate portion of the waist opposite the handle.

LAVERN GOSNELL.

REFERENCES CITED

The following references are of record in the file of this patent:

UNITED STATES PATENTS

| Number | Name | Date |
| --- | --- | --- |
| 333,894 | Simmons et al. | Jan. 5, 1886 |
| 671,795 | Foresman | Apr. 9, 1901 |
| 738,986 | Covert | Sept. 15, 1903 |
| 1,722,513 | Witter | July 30, 1929 |
| 2,428,839 | Di Salino | Oct. 14 1947 |

FOREIGN PATENTS

| Number | Country | Date |
| --- | --- | --- |
| 5,076 | Great Britain | Feb. 28, 1902 |
| 25,606 | Great Britain | Nov. 19, 1907 |